(12) United States Patent
Fasen et al.

(10) Patent No.: US 9,734,853 B2
(45) Date of Patent: Aug. 15, 2017

(54) REDUCING A NOISE COMPONENT ASSOCIATED WITH MOVEMENT OF A MOVEABLE PART

(75) Inventors: Donald J. Fasen, Boise, ID (US);
Martin J. Harper, Boise, ID (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1638 days.

(21) Appl. No.: 13/098,785

(22) Filed: May 2, 2011

(65) Prior Publication Data
US 2012/0281309 A1 Nov. 8, 2012

(51) Int. Cl.
*G11B 5/584* (2006.01)

(52) U.S. Cl.
CPC ................................. *G11B 5/584* (2013.01)

(58) Field of Classification Search
None
See application file for complete search history.

(56) References Cited

U.S. PATENT DOCUMENTS

| | | | | |
|---|---|---|---|---|
| 5,550,685 | A * | 8/1996 | Drouin | 360/77.08 |
| 6,243,225 | B1 * | 6/2001 | Wyman et al. | 360/77.12 |
| 6,762,900 | B2 | 7/2004 | Bui | |
| 6,943,979 | B2 | 9/2005 | Goker | |
| 7,495,859 | B2 | 2/2009 | Weber | |
| 7,652,841 | B2 | 1/2010 | Kawakami | |
| 8,094,405 | B1 * | 1/2012 | Ying et al. | 360/77.04 |
| 2009/0040643 | A1 | 2/2009 | Weng | |
| 2009/0296269 | A1 | 12/2009 | Fujita | |

* cited by examiner

*Primary Examiner* — K. Wong
(74) *Attorney, Agent, or Firm* — Trop, Pruner & Hu, P.C.

(57) ABSTRACT

An output is generated in response to an indication associated with movement of a moveable part in a storage device. The output is for reducing a noise component associated with the movement of the moveable part.

20 Claims, 5 Drawing Sheets

REDUCING A NOISE COMPONENT ASSOCIATED WITH MOVEMENT OF A MOVEABLE PART

BACKGROUND

Various types of storage devices are available to store data for electronic devices. Examples of storage devices include tape-based storage devices, disk-based storage devices, integrated circuit (IC) storage devices, and others.

In a tape-based storage device, data is stored on plural data tracks of a storage tape, where the data tracks extend generally longitudinally along the storage tape. The reading and recording of data in the data tracks is accomplished by using tape heads, which typically include read/write heads for reading/recording data on storage tapes.

The storage tape is moved longitudinally with respect to the tape head during a recording operation or read operation. When reading from or writing to the storage tape, accurate lateral positioning of the tape head with respect to the storage tape is desirable. To achieve accurate lateral positioning of the tape head, servo bands (or servo tracks) are recorded onto the storage tape. The servo bands contain servo patterns that are detectable by the tape head during read/write operations for determining the relative lateral position of the tape head with respect to the storage tape.

As the track density of storage tapes has increased to allow higher storage capacities on storage tapes, the challenges involved in positioning tape heads with respect to storage tapes has also increased.

BRIEF DESCRIPTION OF THE DRAWINGS

Some embodiments are described with respect to the following figures.

DETAILED DESCRIPTION

A storage device, such as a tape drive, includes various moveable parts that are associated with operation of the storage device. One type of moveable part is a roller (or rollers) in the tape drive for guiding storage tape. The roller(s) rotate(s) with longitudinal motion of the storage tape relative to a tape head used to perform read and write operations with respect to the storage tape. Another type of moveable part in the storage device includes reels in the tape drive, including a reel on which the storage tape is initially mounted and a take-up reel to receive the storage tape during operation. There can also be other moveable parts in the tape drive associated with operation of the tape drive.

Figure 1:
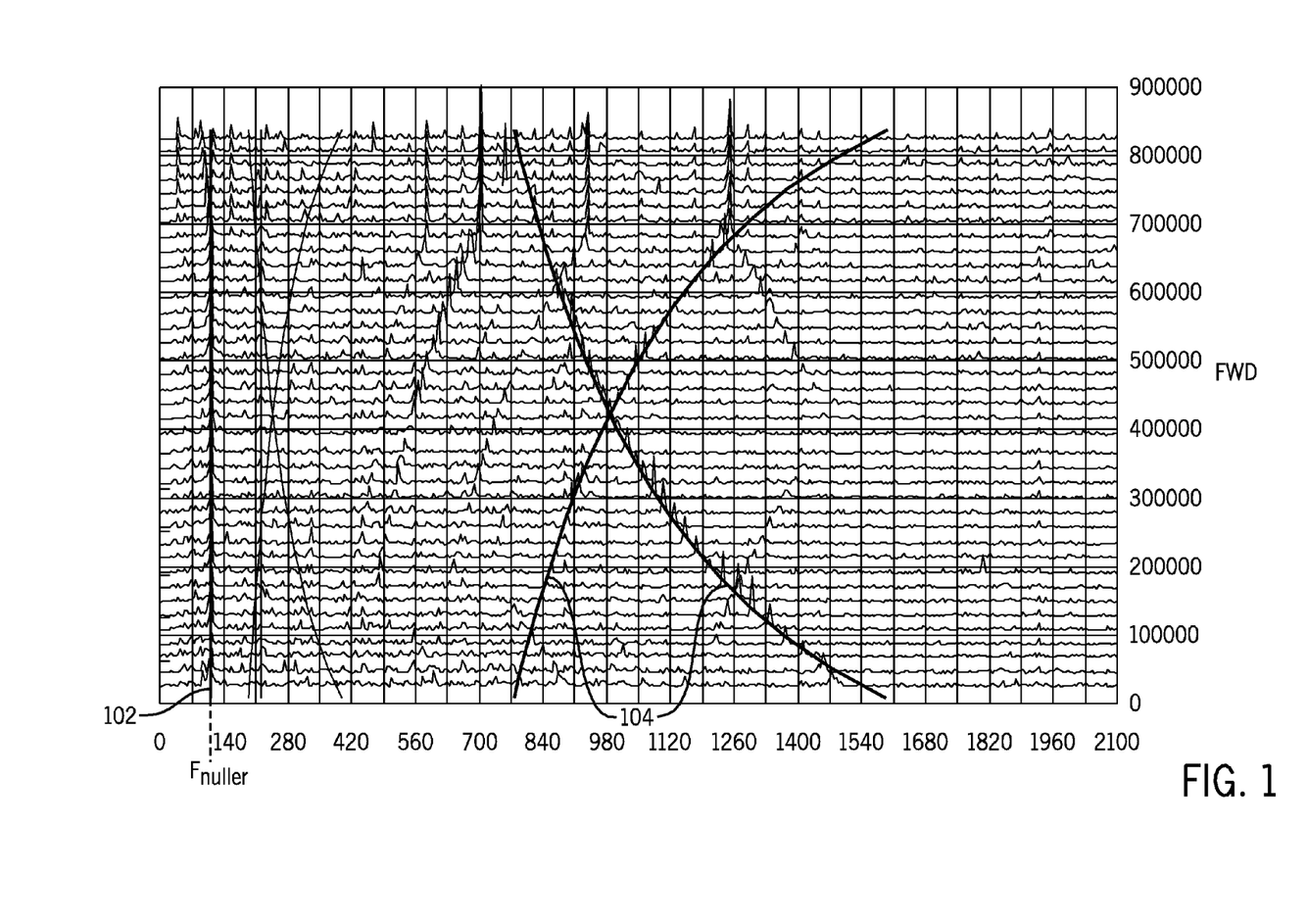
FIG. 1 is a graph depicting frequency domain waveforms to illustrate contribution of noise by moveable parts of a storage device, which can be addressed using techniques or mechanisms according to some implementations.

The presence of various moveable parts in the tape drive can introduce noise components into signals during operation of the tape drive. As the data track density of storage tapes has increased, tape drive performance has become increasingly sensitive to the presence of noise from various sources. As a result, noise components introduced by moveable parts of the tape drive can cause errors that can degrade the performance of the tape drive. FIG. 1 is a graph showing frequency-domain spectrum representations of signals read by a tape head of a tape drive, according to some examples. The horizontal axis of the graph of FIG. 1 shows different frequencies, while the vertical axis of the graph depicts different longitudinal positions along a storage tape. Each waveform shown in the example of FIG. 1 depicts a corresponding frequency-domain spectrum representation of a position error signal (PES) at a respective longitudinal position along the storage tape. A PES is provided by a signal decoder in the tape drive in response to servo signals read from servo tracks of the storage tape by servo read element(s) of the tape head. Each servo track of a storage tape contains a servo pattern that is recorded into the servo track. There can be several servo tracks arranged laterally along the storage tape. The PES provides an indication regarding errors in lateral positioning of the tape head relative to storage tape. The PES can be used by control logic in the tape drive to adjust the relative lateral position of the tape head and storage tape.

As shown in FIG. 1, a vertical line 102 represents contributions to the PES (at the different longitudinal positions of the storage tape) at a particular frequency (referred to as $F_{nuller}$ in the ensuing discussion) that is caused by noise due to rotation of a roller (or rollers) in the tape drive. As can be seen in FIG. 1, the PES component at $F_{nuller}$ is relatively strong, as compared to some other portions of each frequency-domain domain spectrum (as represented by each respective waveform) shown in FIG. 1. Thus, at the frequency $F_{nuller}$ a substantial disturbance is introduced into the PES that can adversely affect the lateral position control performed in the tape drive. Curves 104 shown in FIG. 1 depict noise components contributed by another rotating part, such as a reel of the tape drive, that can also affect lateral positioning performance.

In accordance with some implementations, a nuller logic is provided to reduce PES components caused by noise due to movement of at least one moveable part of a tape drive. For example, the moveable part can be the roller (or rollers) of the tape drive. In the ensuing discussion, reference is made to reducing the effect of noise caused by the roller in a tape drive. However, techniques or mechanisms according to some implementations can also be applied to reduce effects of noise contributed by other moveable parts (e.g. reel or other part) of the tape drive.

The noise reduction is performed at selected one or multiple frequencies (e.g. $F_{nuller}$). The nuller logic effectively reduces the PES component at the selected frequency or frequencies. In some implementations, a frequency considered by the nuller logic is a first harmonic of the frequency associated with the moveable part. The noise contributed by the moveable part can have additional harmonics, which can also be considered by the nuller logic in alternative implementations. In such latter implementations, noise reduction due to a moveable part can be performed at multiple harmonics of the frequency associated with the moveable part.

Moreover, even though reference is made to a tape drive in this discussion, it is noted that techniques or mechanisms according to some implementations can also be applied to other types of storage devices that employ other types of storage media, such as disk-based drives or any other type of storage device that has moveable parts that can cause noise that impact performance of the storage device.

Figure 2:
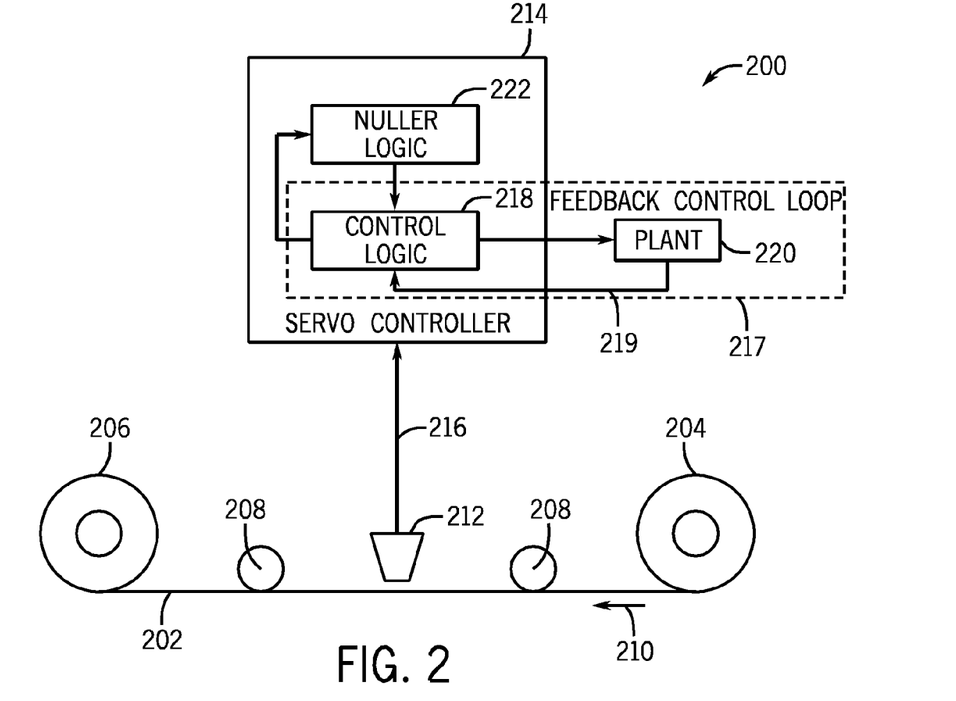
FIG. 2 is a schematic diagram of an example arrangement of a storage device, in accordance with some implementations.

FIG. 2 shows an example arrangement of a tape drive 200 that has a linear storage tape 202 mounted on reels 204 and 206. During operation, the storage tape 202 is dispensed from the reel 204, and received by the take-up reel 206. One or multiple rollers 208 are provided to guide the storage tape 202 during longitudinal movement of the storage tape 202 in a direction indicated by arrow 210. The reels 204, 206, and roller(s) 208 are designed to rotate to allow for longitudinal motion of the storage tape 210.

As further shown in FIG. 2, a tape head 212 is provided to read information on the storage tape 202. The tape head 212 includes read elements (to read data from the storage tape 202), write elements (to write data to the storage tape 202), and servo read elements (to read servo information on the storage tape 202). In the arrangement shown in FIG. 2, the tape head 212 is connected to a servo controller 214. The read and write circuitry of the tape drive are omitted in FIG. 2.

In alternative implementations, where a storage device other than a tape drive is used, the tape head 212 is replaced with a "storage medium access head," which can include any component (or assembly of components) for reading or writing information on a storage medium. Generally, a "storage medium" refers to any of tape-based, disk-based, or other type of storage medium. Also, a "servo track" refers to a servo track that can be recorded in any of these types of storage media.

In implementations according to FIG. 2, the tape head 212 (and more specifically the servo read elements of the tape head 212) provide servo signals 216 to the servo controller 214, where the servo signals 216 are responsive to servo patterns on the storage tape 202. The servo controller 214 includes control logic 218 used for controlling a position of a "plant" 220. The "plant" 220 refers to an assembly of components (e.g. a motor and associated components) that are controllable by the control logic 218 to adjust the relative positioning of the tape head 212 and the storage tape 202. In some examples, the plant 220 is operatively coupled to the tape head 212 for adjusting the position of the tape head 212. Note that the tape head 212 and storage tape 202 can be considered to be part of the plant 220.

The control logic 218 generates a PES (position error signal) in response to the servo signals 216 received from the servo read element of the tape head 212. In response to the PES, the control logic 218 adjusts the plant 220 to cause adjustment of the relative lateral positioning of the tape head 212 and storage tape 202, such that a data read element or data write element of the tape head 212 is properly centered with respect to a target data track 202. Note that PES constitutes one form of error indication regarding the relative lateral positioning of a tape head and storage tape. In other examples, other forms of indications of lateral positioning of a tape head with respect to a storage medium can be used.

The control logic 218 and plant 220 are part of a feedback control loop 217 (also referred to as a "control system"). The plant 220 provides a feedback indication (219) back to the control logic 218. The feedback indication 219 can provide an indication of the relative positioning of the tape head 212 and the storage tape 202. Based on the feedback indication 219, the control logic 218 can further adjust its outputs (e.g. PES) for controlling the plant 220.

In accordance with some implementations, the servo controller 214 also includes nuller logic 222 that cooperates with the control logic 218 to reduce a noise component caused by movement of at least one moveable part in the tape drive 200. As shown in FIG. 2, moveable parts include the roller(s) 208 and the reels 204 and 206. Details regarding the nuller logic 222 are discussed further below.

Figure 3:
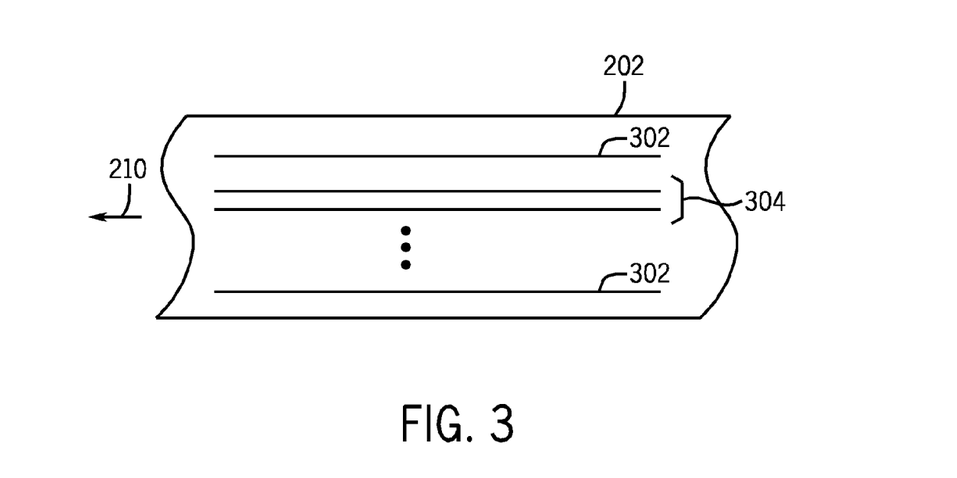
FIG. 3 is a schematic diagram of a storage tape useable in the storage device of FIG. 2 according to some implementations.

FIG. 3 is a schematic diagram of various tracks that can be written onto the storage tape 202. As shown, the tracks on the storage tape 202 include servo tracks 302 and data tracks 304. Data can be written onto the data tracks 304 and read from the data tracks 304. The servo tracks 302 store servo patterns, which are written onto the servo tracks during a preparatory formatting process known as "servo writing" prior to actual use of the storage tape for data storage. In some examples, servo patterns written onto the servo tracks 302 include magnetic flux transitions (in the form of stripes) each extending across the width (in the lateral direction that is generally perpendicular to the direction indicated by arrow 210) of the storage tape 202.

In some examples, the storage tape 202 can be according to the Linear Tape Open (LTO) format. In other implementations, other storage tape formats can be employed.

Figure 4A:
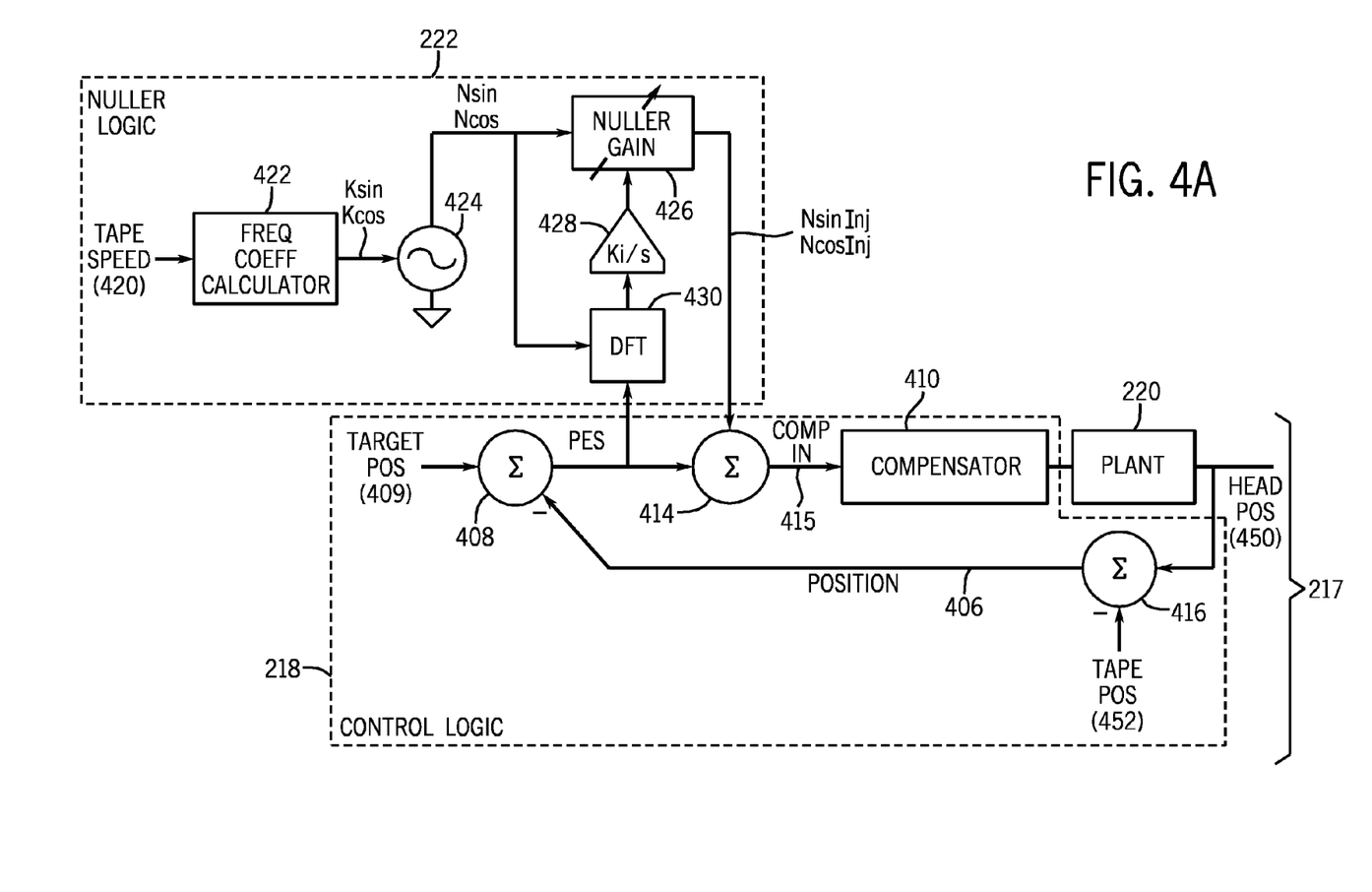
FIG. 4A is a block diagram of details of components of a control system and a nuller logic, in accordance with some implementations.

FIG. 4A is a schematic diagram that depicts in further detail the nuller logic 222 and the control logic 218 of FIG. 2. As depicted in FIG. 4A, the control logic 218 and the plant 220 are part of the feedback control loop (or control system) 217 that is also shown in FIG. 2. In the feedback control loop 217, position information 406 is fed back and compared (by a summer 408) with a target position (409) to derive a PES. The position information 406 is subtracted from the target position 409 (by the summer 408) to produce the PES.

As further shown in FIG. 4A, the position information 406 is based on a comparison of the position of the tape head 212 (as represented by head position 450) and the position of the storage tape 202 (as represented by tape position 452). A summer 416 takes the difference between the head position 450 and the tape position 452 to produce the position information 406. This summer is to model the position differencing inherent in the detection of the servo pattern on the storage tape 202 by the servo elements on the tape head 212. Since the position is detected as the head element relative to the servo track, the position (406) represents the difference between the head position and the tape position.

A position error signal (PES) is produced by subtracting the position signal (406) from the desired or target position (409) with the summer 408. The PES output from the summer 408 is provided as an input to another summer 414, which further receives an output of the nuller logic 222. The summer 414 sums the PES with the output of the nuller logic 222 to provide a compensator input (Comp In) signal 415. The combination of the PES with the output of the nuller logic 222 performed by the summer 414 results in reduction or elimination of a PES component at a frequency (or multiple frequencies) associated with noise caused by a moveable part (or multiple moveable parts) of the tape drive. For example, one such frequency is $F_{nuller}$ depicted in FIG. 1.

According to the compensator input signal 415, a compensator 410 modifies its control of the plant 220, which causes adjustment of the relative positioning of the tape head 212 and storage tape 202 in FIG. 2. As the relative positioning of the tape head 212 and storage tape 202 change, the values of the head position 450 and/or tape position 452 may change, which may cause the position information 406 output by the summer 416 to change. This in turn causes the PES output by the summer 408 to change, which may result in the compensator 410 changing its control of the plant 220.

The PES output from the summer 408 is also input into the nuller logic 222. Providing the PES to the nuller logic 222 allows the nuller logic 222 to produce an output (including N sin Inj and N cos Inj signals) that when combined with PES causes PES component(s) at selected frequency(ies), such as $F_{nuller}$, to be reduced or eliminated.

The nuller logic 222 also receives as input an indication of tape speed (420). For example, the indication of tape speed (420) can be based on the rotational speed of the roller 208 or reel (204, 206) as measured by a sensor (or sensors).

The frequency of the PES component caused by rotation of the roller 208 (or movement of other moveable part) changes due to variation of the tape speed. For example, host devices that can access the tape drive 200 can communicate data at different speeds. Due to such variations in transfer data speeds, the tape speed varies accordingly. In some examples, the tape speed can vary within a 3:1 range (where the maximum tape speed can be three times the minimum tape speed that may be encountered during operation of the tape drive 200). In other examples, other possible ranges of tape speed variation can be present.

The tape speed indication (420) is provided to a frequency coefficient calculator 422, which outputs two coefficients: K sin and K cos. The coefficients K sin and K cos calculated by the frequency coefficient calculator 422 are fed into an oscillator 424 of the nuller logic 222. Although reference is made to "oscillator" in the singular sense, note that the oscillator 424 includes multiple oscillator circuits for producing respective different signals, including a sine signal (N sin) and a cosine signal (N cos), which are oscillating signals. Note that generally, in FIG. 4A, each line between components represents provision of two signals, one for the sine component and one for the cosine component.

The sine and cosine signals (N sin and N cos) are output from the oscillator 424 and provided to a parameter adjustment block 426 and to a discrete Fourier transform (DFT) block 430. The parameter adjustment block 426 can adjust the amplitude of the sine and cosine signals (N sin and N cos). The output of the parameter adjustment block 426 includes N sin Inj and N cos Inj, which represent adjusted versions of the N sin and N cos signals, respectively, from the oscillator 424.

When the output (N sin Inj and N cos Inj) of the parameter adjustment block 426 is combined by the summer 414 of FIG. 4A with the PES, the component of the PES at each selected frequency (e.g. $F_{nuller}$) corresponding to noise due to a moveable part is reduced.

The adjustment performed by the parameter adjustment block 426 is based on an output of an integrator 428. The input of the integrator 428 receives an output of the DFT block 430. The blocks 426, 428, and 430 effectively adjust the gain of the oscillator summation into 414 at each frequency of interest (e.g. $F_{nuller}$) by taking the integral of the DFT of the PES.

The DFT block 430 performs a Discrete Fourier Transform on the PES received from the control logic 218 The output of the DFT block 430 is based on accumulating the product of PES and the N sin and N cos signals from the oscillator 424.

Note that due to variations in the tape speed (as specified by the tape speed indication 420), the K sin and K cos values would vary, and consequently, the N sin and N cos signals output by the oscillator 424 would also vary in frequency. The integrator 428 accumulates the sine and cosine outputs of the DFT block 430 and adjusts the amplitude of N sin Inj and N cos Inj until the PES component output by the DFT block 430 goes to zero. The integrator 428 is designed to drive the PES component(s) at the frequency(ies) corresponding to noise contributed by at least one moveable part to zero. Driving the PES component(s) at a particular frequency (or at selected frequencies) to zero results in reducing the amplitude of the PES component at such frequency(ies) and thus overall PES.

The computations performed by the nuller logic 222 are performed in multiple iterations. In some implementations, multiple nuller cycles are defined, where each nuller cycle includes multiple iterations (e.g. two iterations or alternatively more than two iterations). The computations of the nuller logic 222 are performed continually to track the adaptive tape speed (as represented by the tape speed indication 420). To enhance efficiency, the computations performed by the nuller logic 222 are relatively simple. For example, as discussed further below, a relatively low order Taylor series can be used to approximate sine and cosine functions to reduce computation complexity. In some implementations, the oscillator 424 is reset every nuller cycle (where each nuller cycle has multiple iterations) to allow for acceptable accuracy.

The following describes examples relating to calculation of various parameters by the nuller logic 222. Note that the various parameters are provided for purposes of example. In other examples, computations of other parameters can be performed by the nuller logic 222. Also, the computations of the various parameters discussed below employ various predefined scale factors or other constants to allow fixed point processing. These predefined scale factors and constants are determined based on the signal range and resolution specifications. The predefined scale factors and constants can vary depending upon implementation details.

The oscillator calculation is iterative and is reset and restarted after a prescribed number of oscillator cycles. In this reset condition, the calculation of new frequency coefficients (422), DFT results (430), integrator output (428) and nuller gains (426) is performed.

The frequency coefficient calculator 422 computes the two coefficients, K sin and K cos, based on the tape speed indication (420). The coefficient K sin can be calculated a follows:

$$K\ \sin=(wksf\text{-}reg/4)*w2ki/wksf/2, \quad\quad\quad\text{(Eq. 1)}$$

where wksf is a predefined scale factor, w2ki is a parameter that has a value that is proportional to TapeSpeed (which corresponds to the tape speed indication 420), and reg is based on the square of w2ki (w2ki$^2$). The coefficient K cos is calculated as follows:

$$K\ \cos=(wksf\text{-}reg/4). \quad\quad\quad\text{(Eq. 2)}$$

The parameter, w2ki, is more specifically derived as follows (in some examples):

$$w2ki=Kw2k*\text{Tapespeed}*\text{Constant1}, \quad\quad\quad\text{(Eq. 3)}$$

where Constant1 is a predefined constant. Also Kw2k is defined as follows:

$$Kw2k=F_{nuller}*2*\text{pi}/FS, \quad\quad\quad\text{(Eq. 4)}$$

where FS represents the sample rate (rate of sampling PES). The computations of K sin and K cos in Eqs. 1-2 above allow for approximations of sine and cosine functions (N sin and N cos) using a low order (e.g. second order) Taylor series.

Based on the coefficients K sin and K cos calculated by the frequency coefficient calculator 422, the oscillator 424 calculates the N sin and N cos signals as follows:

$$N\sin = (N\sin\_p * K\cos + N\cos\_p * K\sin), \quad \text{(Eq. 5)}$$

$$N\cos = (N\cos\_p * K\cos - N\sin\_p * K\sin), \quad \text{(Eq. 6)}$$

where K sin and K cos are calculated according to Eqs. 1 and 2, respectively, and N sin_p and N cos_p represent previous versions of the N sin and N cos signals, respectively. As noted above, the nuller logic 222 performs an iterative process in which multiple iterations, in multiple nuller cycles, are performed for progressively refining the output of the nuller logic 222 to achieve reduction of the PES component caused by roller noise (or noise due to other moveable parts). N sin_p and N cos_p represent the previous versions of N sin and N cos, respectively, in the previous iteration. With each reset cycle, the N sin and N cos signals may change frequency due to tape speed variation.

Based on the sine and cosine signals (N sin and N cos) output from the oscillator 424, the parameter adjustment block 426 adjusts the gain (amplitude) of the N sin and N cos signals, as follows:

$$N\sin\text{Inj} = Sinj * N\sin/wksf, \quad \text{(Eq. 7)}$$

$$N\cos\text{Inj} = Cinjd * N\cos/wksf, \quad \text{(Eq. 8)}$$

where Sinj and Cinjd are derived from the output of the integrator 428. The parameters Sinj and Cinj (note Cinjd is a time delayed version of Cinj) are calculated as follows:

$$Sinj = Sinj\_p + (Sdft * Knull), \quad \text{(Eq. 9)}$$

$$Cinj = Cinj\_p + (Cdft * Knull), \quad \text{(Eq. 10)}$$

where Sdft and Cdft are output from the DFT block 430. Also, in Eq. 9 and 10 above, Knull is a predefined nuller gain constant value (Ki in 428). Knull sets the rate at which the nuller will drive the PES component to zero.

The values of Sdft and Cdft (output from DFT block 430) are calculated according to:

$$Sdft = (Ssum) * Ksum/Constant2, \quad \text{(Eq. 11)}$$

$$Cdft = (Csum) * Ksum/Constant2, \quad \text{(Eq. 12)}$$

where
Constant2 is a predefined constant value,
Ksum is a value that is proportional to TapeSpeed,
The multiplication by Ksum/Constant2 effectively divides by the number of samples in Ssum and Csum without involving a slow divide operation.

$$Ssum = Ssum\_p + (N\sin * PES), \quad \text{(Eq. 13)}$$

$$Csum = Csum\_p + (N\cos * PES). \quad \text{(Eq. 14)}$$

In Eq. 13 and 14, PES_value represents the PES received from the control logic 218 of FIG. 4A. Also, note that Eq. 13 and 14 iteratively accumulate (by summing) the respective products of PES_value and N sin or N cos. In the iterative process performed by the nuller logic 222, the accumulation (summing) of Ssum and Csum is over multiple iterations associated with respective values of N sin and N cos.

Note also that Eqs. 9 and 10 also accumulate Sinj and Cinj, based on the products of Sdft and Knull and Cdft and Knull, respectively. However, the calculations of Sdft, Cdft, Sinj, and Cinjd are performed less frequently than the calculations of Ssum and Csum. While Ssum and Csum are updated on each iteration of the iterative process of the nuller logic 222, Sdft, Cdft, Sinj, and Cinjd are updated at the end of each nuller cycle, where the nuller cycle has a duration containing multiple iterations (e.g., each nuller cycle can include two iterations, or alternatively, more than two iterations).

At the end of each nuller cycle, the oscillator 424 is reset and the iterative process repeats. Resetting the oscillator 424 involves resetting various parameters as follows: N sin=0, and N cos=wksf. Also, the Ssum and Csum parameters accumulated by the DFT block 430 is reset to zero. Although Ssum and Csum are reset, note that Sinj and Cinj as output by the integrator 428 are not reset—instead, the Sinj and Cinj continue to accumulate until the PES component at the selected frequency (e.g. $F_{nuller}$) is driven to zero.

In some cases, noise components due to movement of a moveable part can be at higher frequencies, such as frequencies greater than a few hundred Hz. For example, as shown in FIG. 1, noise components due to rotation of a reel (e.g. 204 or 206 in FIG. 2) occur at frequencies ($F_{nuller}$) greater than 700 Hz. The plant 220 (FIG. 2) can have a phase shift that increases with frequency. As a result, a phase correction may have to be applied in some implementations when $F_{nuller}$ is greater than a predefined frequency threshold.

Figure 4B:
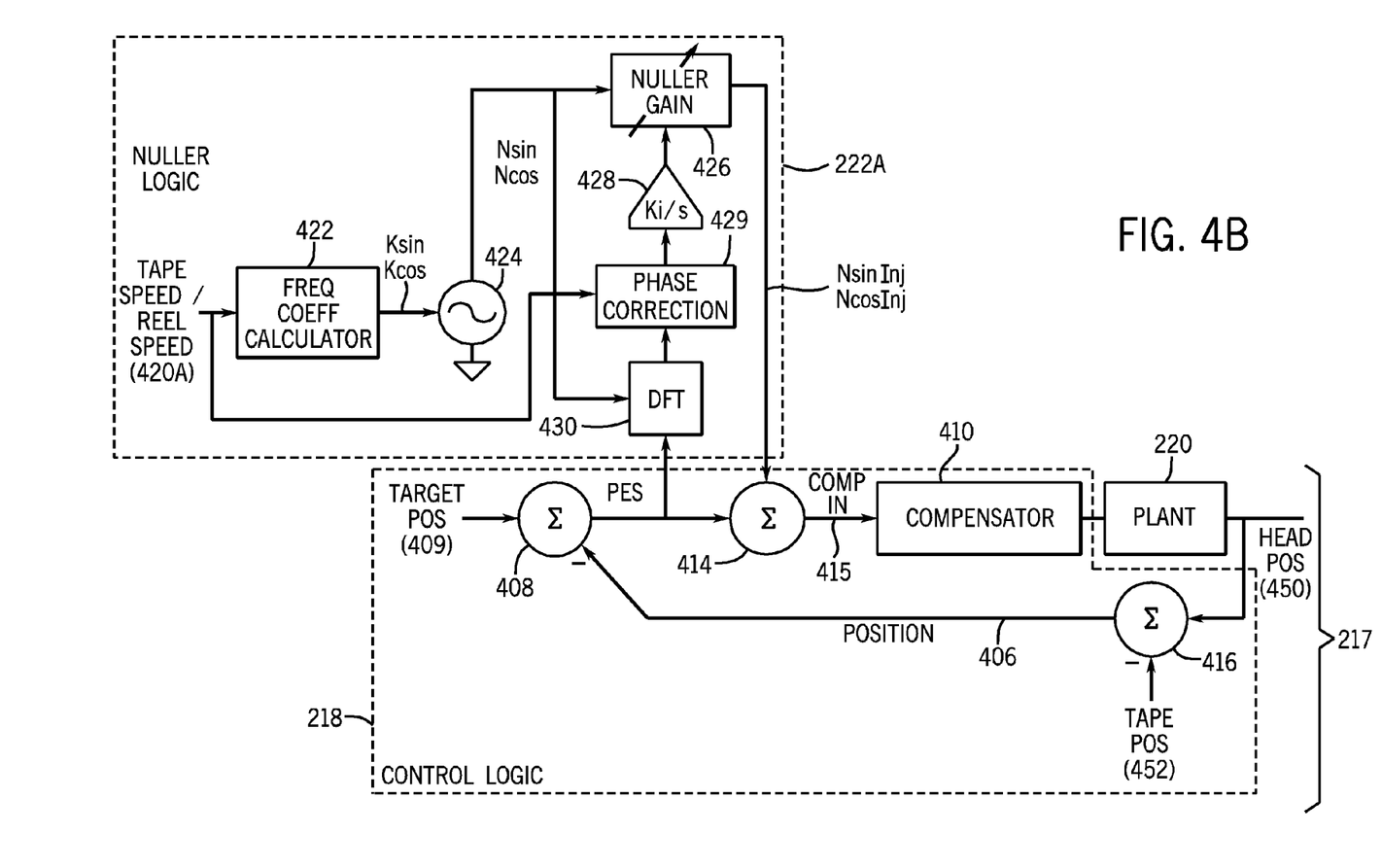
FIG. 4B is a block diagram of details of components of a control system and a nuller logic, in accordance with alternative implementations.

The phase correction is a complex number that compensates for the phase shift of the plant 220. As shown in FIG. 4B, a phase correction block 429 can be added to nuller logic 222A to process the output of the DFT block 430. In FIG. 4B, the integrator 428 receives output from the phase correction block 429 instead of from the DFT block 430 (as in FIG. 4A).

The output of the phase correction block 429 includes corrected versions, SdftCorr and CdftCorr, of the Sdft and Cdft signals, respectively, from the DFT block 430. Thus, with implementations according to FIG. 4B, Eqs. 9 and 10 above (for computing Sinj and Cinj by the integrator 428) are modified to use the SdftCorr and CdftCorr signals, respectively, instead of the Sdft and Cdft signals.

The phase corrected DFT output is calculated as follows:

$$SdftCorr = Sdft * PhCorrRe + Cdft * PhCorrIm, \text{ and} \quad \text{(Eq. 15)}$$

$$CdftCorr = Cdft * PhCorrRe - Sdft * PhCorrIm, \quad \text{(Eq. 16)}$$

where PhCorrRe is the real phase correction term, and PhCorrIm is the imaginary phase correction term.

As with coefficients for the oscillator 424 discussed above, a Taylor series can be used to approximate real and imaginary terms of the phase correction:

$$PhCorrIm = PhCorr * (1 - PhCorr^2/6), \text{ and} \quad \text{(Eq. 17)}$$

$$PhCorrRe = 1 - PhCorr^2/2. \quad \text{(Eq. 18)}$$

The value of PhCorr in Eqs. 17 and 18 is dependent upon the frequencies of interest, as expressed by $F_{nuller}$. For rotation of the reel 204 or 206, $$F_{nuller} = ReelSpeed * HarmonicNumber, \quad \text{(Eq. 19)}$$

where ReelSpeed represents the rotational speed of the reel (420A in FIG. 4B), and HarmonicNumber represents the desired harmonic for the nuller logic 222A.

More specifically, according to some implementations, PhCorr is calculated using a line model as follows:

$$PhCorr = PhCorrSlope * F_{nuller} + PhCorrIntercept, \quad \text{(Eq. 20)}$$

where PhCorrSlope and PhCorIntercept represent a linear approximation to the phase versus frequency response of the plant 220.

Figure 5:
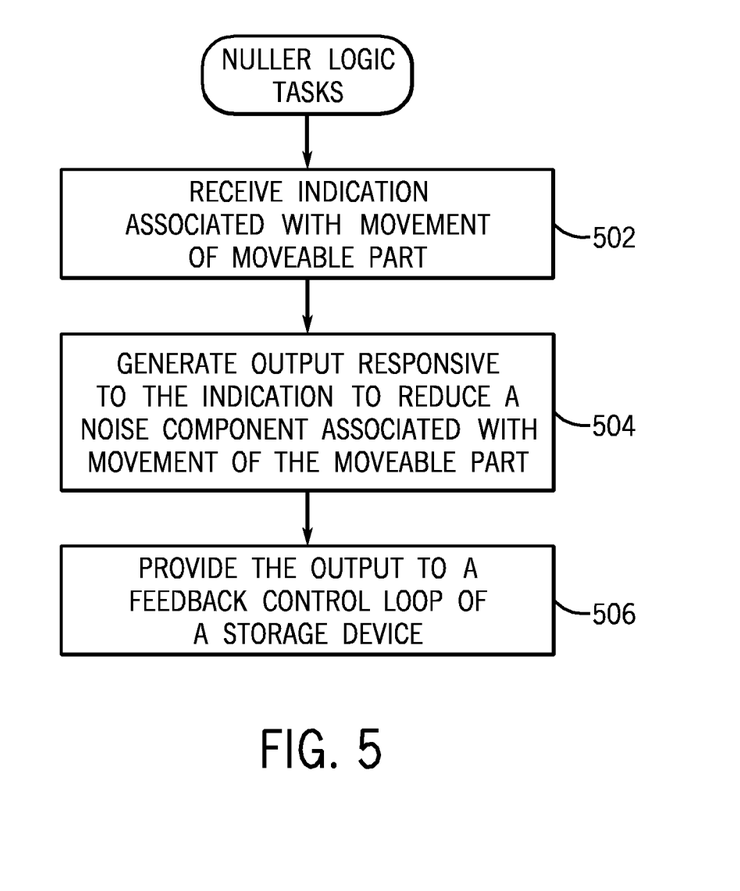
FIG. 5 is a flow diagram of a process of reducing a noise component associated with a moveable part of the storage device, in accordance with some implementations.

FIG. 5 illustrates a general flow diagram of a process of the nuller logic 222 or 222A according to some implementations. The nuller logic 222 or 222A receives (at 502) an indication associated with movement of a moveable part of a storage device. For example, this indication can be the tape speed indication 420 or 420A shown in FIG. 4A or 4B.

In response to the indication, the nuller logic 222 generates (at 504) an output for reducing a noise component associated with the movement of the moveable part. In implementations according to FIG. 4A or 4B, the output includes the N sin Inj and N cos Inj signals output by the parameter adjustment block 426. The output is then provided (at 506) to a feedback control loop (e.g. 217 in FIG. 4A or 4B) of the storage device.

Note that the tasks of FIG. 5 are iterative and are performed continually to track variations in movements of the moveable part (such as variations in rotational speeds of rollers caused by variations in tape speed).

The nuller logic 222 or 222A can be implemented with hardware in some implementations. In other implementations, parts of the nuller logic 222 or 222A can be implemented with machine-readable instructions executed on one or multiple processors. In the latter implementations, the machine-readable instructions can be stored in machine-readable storage media, such as a disk-based storage medium, an integrated circuit storage medium, and so forth.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. An apparatus for a storage device, comprising:
   a control system to implement a control loop that controls relative positioning between a storage medium and an access head of the storage device; and
   a nuller logic to:
      receive information of a speed of a moveable part of the storage device;
      generate an output responsive to the received information, wherein the output is for reducing a noise component associated with movement of the moveable part; and
      provide the output to the control loop of the control system.

2. The apparatus of claim 1, wherein the moveable part is a rotatable part, and wherein the speed is variable across a range during operation of the storage device.

3. The apparatus of claim 1, wherein the output includes an output cosine signal and an output sine signal.

4. The apparatus of claim 1, wherein the nuller logic includes an integrator to cause reduction, at a particular frequency corresponding to the movement of the moveable part, of an amplitude of a component of a position error signal in the control loop.

5. The apparatus of claim 4, wherein the integrator is to drive the amplitude of the component of the position error signal at the particular frequency to zero.

6. The apparatus of claim 4, wherein the nuller logic further comprises a discrete Fourier transform (DFT) block to receive the position error signal from the control loop, and to apply a DFT on the received position error signal, wherein the integrator is to compute an integral of an output of the DFT block.

7. The apparatus of claim 6, wherein the nuller logic further comprises a phase correction block to correct the output of the DFT block, where the phase correction block is to provide phase corrected signals to the integrator to compute the integral.

8. The apparatus of claim 1, wherein the nuller logic is to further receive a position error signal from the control system, where the output is further based on the position error signal, and
   wherein the control system is to combine the position error signal with the output of the nuller logic to produce a compensation signal, and wherein the control system includes a compensator to adjust components in the storage device according to the compensation signal, wherein adjustment of the components causes adjustment of the relative positioning between the storage medium and the access head.

9. The apparatus of claim 1, wherein the moveable part is configured to move the storage medium.

10. The apparatus of claim 1, wherein the storage medium is a tape, and wherein the moveable part is a roller to move the tape.

11. The apparatus of claim 8, wherein the control system has a summer to sum the position error signal with the output of the nuller logic.

12. A method associated with a storage device, comprising:
   receiving a position error signal based on servo information on a storage medium;
   using the position error signal in a control loop for controlling relative positioning of an access head and the storage medium;
   receiving information of a speed of a moveable part in the storage device;
   generating a correction output based on the speed of the moveable part in the storage device; and
   inputting the correction output into the control loop to affect the controlling for reducing a noise component associated with movement of the moveable part.

13. The method of claim 12, wherein reducing the noise component comprises reducing a component of the position error signal contributed by the movement of the moveable part.

14. The method of claim 12, wherein generating the correction output is performed by a nuller logic that receives as input the position error signal and the information of the speed of the moveable part.

15. The method of claim 14, further comprising:
   applying, by a discrete Fourier transform (DFT) block in the nuller logic, a DFT on the position error signal; and
   computing, by an integrator in the nuller logic, an integral of an output of the DFT block,
   wherein the correction output is generated based on the integral and signals produced from the information of the speed of the moveable part.

16. The method of claim 12, wherein generating the correction output comprises:
   varying coefficients according to different speeds of movement of the moveable part specified in received information containing the different speeds;
   generating, by an oscillator, oscillating signals corresponding to the coefficients.

17. The method of claim 16, wherein generating the correction output further comprises:
   accumulating products of the position error signal with the oscillating signals in successive iterations.

18. The method of claim 17, further comprising:
   combining, by the control loop, the correction output with the position error signal to produce a compensation signal; and controlling the relative positioning of the access head and the storage medium in response to the compensation signal.

19. The method of claim 18, further comprising:

modifying the position error signal in response to the controlling of the relative positioning of the access head and the storage medium; and repeating the using, generating, and inputting based on the modified position error signal.

20. A storage device comprising:

an access head to access information on a storage medium;

a control system to control relative positioning of the access head and the storage medium; and a nuller logic to:
receive a position error signal from the control system;
receive an indication associated with movement of a moveable part of) the storage device; and
calculate a correction output based on the position error signal and the indication associated with the movement, wherein the nuller logic is to apply a discrete Fourier transform on the position error signal and to compute an integral of an output of the discrete Fourier transform, where the correction output is based on the integral, wherein the control system is to control the relative positioning of the access head and the storage medium using the correction output.

* * * * *